United States Patent [19]

Ulrich et al.

[11] Patent Number: 4,627,522

[45] Date of Patent: Dec. 9, 1986

[54] HAND ENGINE AND BRAKE CONTROL MECHANISM FOR A VEHICLE

[75] Inventors: Paul L. Ulrich, Redford; James Richards, Sterling Heights; Eugene T. Tanke, II, Vassar, all of Mich.

[73] Assignee: General Motors Corporation, Detroit, Mich.

[21] Appl. No.: 680,977

[22] Filed: Dec. 12, 1984

[51] Int. Cl.4 .................. G05G 9/04; B60K 41/20
[52] U.S. Cl. .................................... 192/35; 74/481; 74/482; 74/484 R
[58] Field of Search ............... 74/481, 482, 484 R; 192/3 S

[56] References Cited

U.S. PATENT DOCUMENTS

| | | | |
|---|---|---|---|
| 1,552,135 | 9/1925 | Frink | 192/3 S |
| 2,548,240 | 4/1951 | Reeder et al. | 192/3 |
| 2,586,111 | 2/1952 | Maurice et al. | 192/3 |
| 2,602,348 | 7/1952 | Wilson | 192/3 S X |
| 2,724,285 | 11/1955 | Lerman | 74/481 |
| 2,777,335 | 1/1957 | Engberg et al. | 192/3 S |
| 2,949,044 | 8/1960 | Hughes | 74/481 |
| 2,979,172 | 4/1961 | Eshbaugh et al. | 74/482 X |
| 3,106,198 | 10/1963 | Hansen | 74/487 X |
| 3,747,426 | 7/1973 | Schluckebier | 74/492 |
| 3,788,148 | 1/1974 | Connell et al. | 74/492 |
| 4,436,191 | 3/1984 | Perry | 192/3 S |

FOREIGN PATENT DOCUMENTS 1539880  2/1979  United Kingdom ............... 192/3 S Primary Examiner—Allan D. Herrmann
Attorney, Agent, or Firm—D. D. McGraw

[57] ABSTRACT

A vehicle engine throttle and brake hand control mechanism having a hand operated input lever movable in one plane to drive a push-pull cable output member axially to control movements of the engine throttle while permitting unemcumbered actuation of the engine throttle by the accelerator pedal, and movable in another plane perpendicular to the first plane to independently drive a brake actuating push rod to control the vehicle brakes, the input lever also being movable to concurrently control the engine throttle and the vehicle brakes.

1 Claim, 5 Drawing Figures

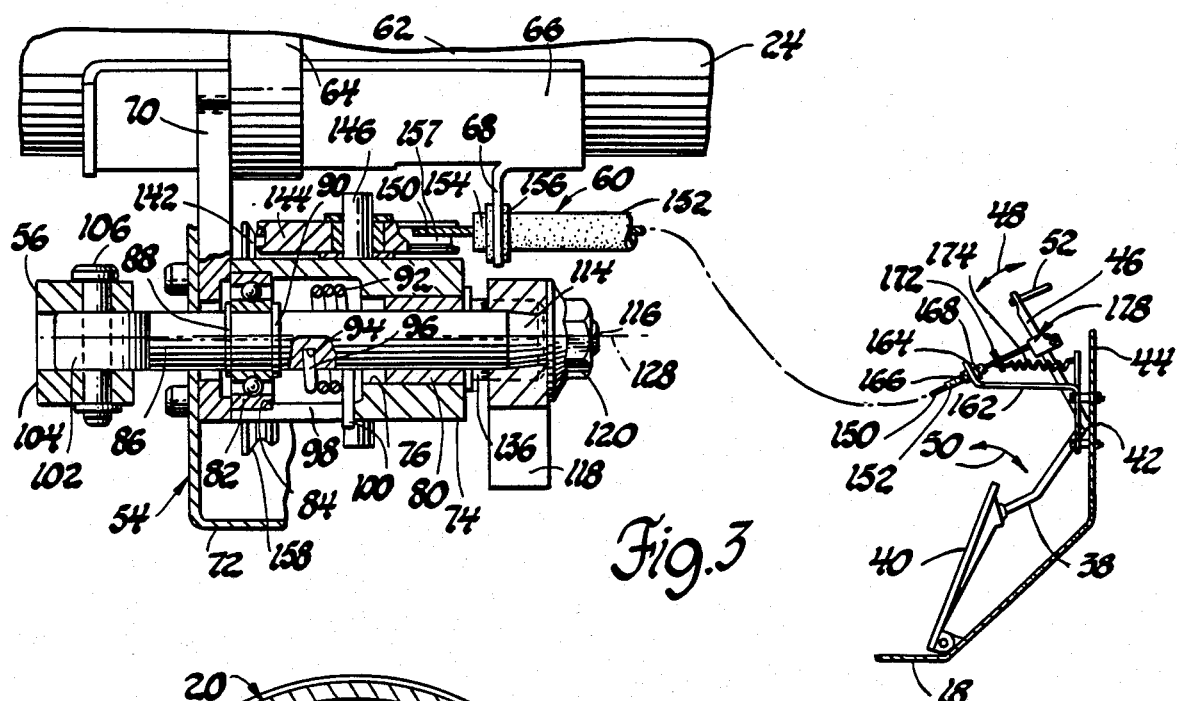
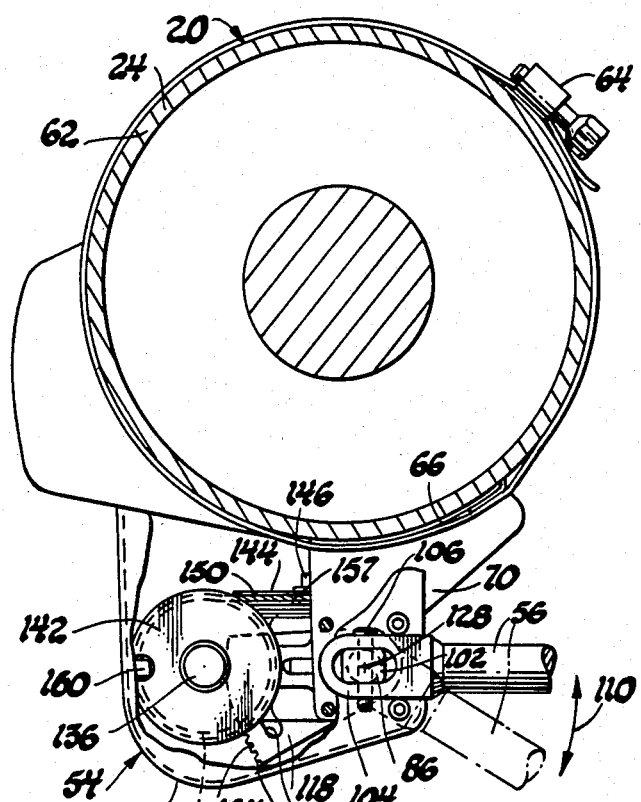
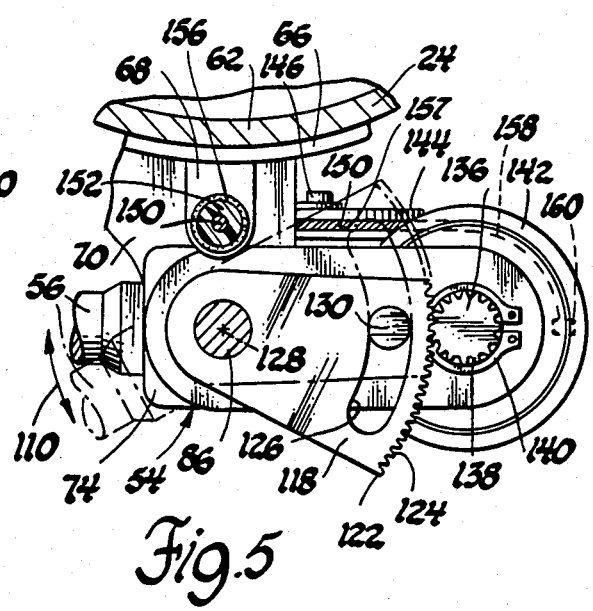

HAND ENGINE AND BRAKE CONTROL MECHANISM FOR A VEHICLE

The invention relates to a mechanism for controlling a vehicle engine and the vehicle brakes by hand, and particularly to such a mechanism which will permit a person with lower body disability to operate a vehicle in a normal manner, with the engine and brake mechanisms under full control of the operator by means of a hand controlled lever. More particularly, the invention relates to a hand operated engine throttle and vehicle brake control system which is simple and rugged in construction, is capable of being manufactured and sold at a low cost, and will fit various vehicle body sizes without alteration to the basic control package. The mechanism embodying the invention may be used on vehicles having tiltable and/or collapsible steering columns without any effect on either the engine control or the brake control when the steering column is tilted or collapsed. The mechanism is entirely mechanical in operation, and does not rely on electrical or fluid power within the mechanism for control purposes so long as the vehicle is equipped with a typical production power brake system.

The mechanism embodying the invention is a compact device attached to the steering column immediately below the steering wheel, with a push-pull cable leading along the steering column and through the instrument panel to a throttle linkage lever behind and underneath the instrument panel but within the passenger compartment. The mechanism has a pilot lever operating as an input member which extends outwardly below and generally parallel to the plane of the steering wheel somewhat like a typical transmission column shift control lever. The pilot lever is moveable, in a first plane which is substantially parallel to the plane of the steering wheel, from an engine idle position throughout the engine throttle control range to a full throttle position for maximum engine speed or power. The pilot lever is also pivotally moveable, in a second plane perpendicular to the first plane and therefore substantially parallel to the axis of the steering column, downwardly from a zero brake or brake release position to a full brake application position. One end of the pilot lever is pivotally attached to the compact device secured to the steering column. At about one-third to about one-half of the pilot lever's length from its pivot point, a suitable pivot connection is made to a brake push rod which extends generally parallel to the steering column and is connected by another pivot connection to the vehicle brake pedal. This connection is such that the vehicle brake pedal may be controlled by a vehicle operator's foot at any time that an operator capable of so using the brake pedal is controlling the vehicle. By this arrangement, a steering column having a tilt steering wheel mechanism may be tilted throughout its range without effecting the engine and brake control positions achieved by the pilot lever position. Thus the vehicle operator can tilt the steering wheel fully upwardly without affecting the controls, and may move it to any intermediate or lower tilt position. Axial collapsing movement of the steering wheel will merely flex the push-pull cable with no cable axial movement. The brake push rod will cause the pilot lever to pivot upwardly without exerting a brake application force on the brake pedal. There is a minimal amount of intrusion of the device into the envelope of space around the steering mechanism used by the vehicle operator. The engine control mechanism such as the typical accelerator pedal may be used in the normal manner without any interference whatsoever. The throttle linkage moved by the accelerator pedal does not feed back to the mechanism to cause movement of the pilot lever when the accelerator pedal is moved by foot. The mechanism may be installed in a minimum amount of time, and may be readily removed from one vehicle and installed in another vehicle with minimal alterations. The pilot lever may be positioned to extend to the vehicle operator's right if the vehicle operator normally would control the mechanism with the right hand, or may be installed to extend to the left if the operator will normally control the mechanism with the left hand. This is particularly important to many disabled persons since they may have better use and control of the left hand and arm than of the right hand and arm. It also makes the mechanism compatible with vehicles having a right hand drive.

The pilot lever is operable in any part of a generally rectangular pattern of movement defined from engine idle to full engine throttle opening along one side and from brake release to full brake application along the other side. The vehicle operator can therefore control the engine without applying the brake, may control the vehicle brakes without changing the throttle setting, and may apply the brakes while also providing part throttle operation of the engine. The latter mode of operation is particularly important when starting a vehicle from a stop position on a hill, for example.

Systems presently offered paraplegic vehicle operators through the Veterans Administration, for example, are considerably more complicated, require major vehicle alterations, require several hours installation time, are not readily moveable from one vehicle to another, and intrude into the vehicle operator space to such an extent that they are generally uncomfortable for use by the disabled operator, and extremely so when the vehicle is to be used by an able-bodied operator. The mechanism embodying the invention overcomes these objections and provides an esthetically pleasing device.

IN THE DRAWING

FIG. 3 is a cross-section view, with parts broken away, taken in the direction of arrows 3—3 of FIG. 2 and also somewhat schematically illustrating portions of the engine control linkage to which the mechanism is attached.

FIG. 4 is a fragmentary cross-section view of the mechanism embodying the the invention and is taken in the direction of arrows 4—4 of FIG. 2.

FIG. 5 is another fragmentary cross-section view of a portion of the mechanism embodying the invention and is taken in the direction of arrows 5—5 of FIG. 2.

Figure 1:
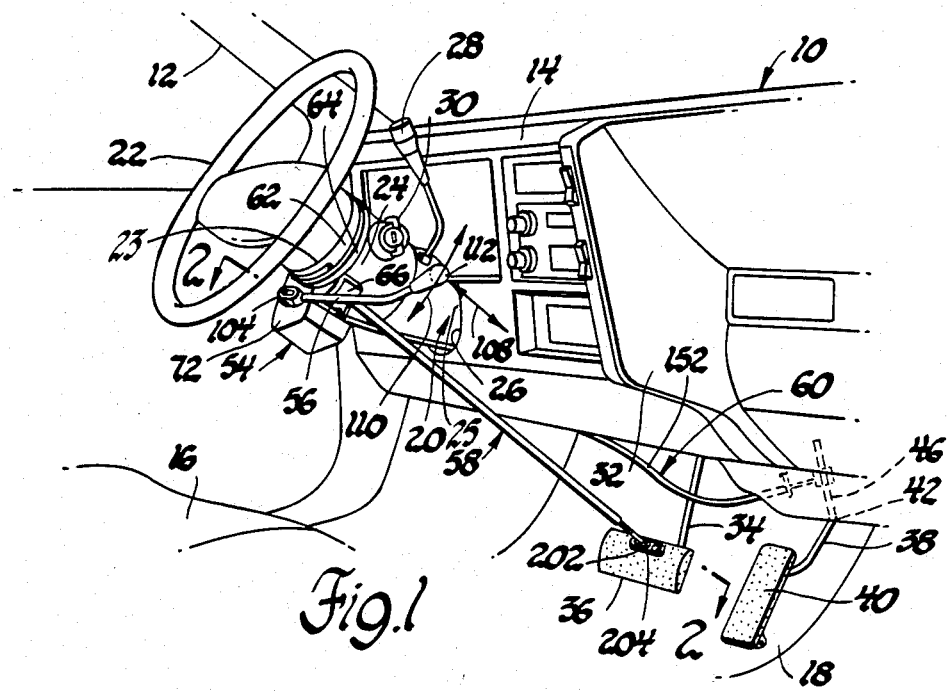
FIG. 1 is a perspective view, with parts broken away, of a portion of a typical passenger vehicle having the mechanism embodying the invention installed therein.

In FIG. 1, a passenger vehicle 10 has portions thereof illustrated which relate to the control of the vehicle by the vehicle operator. The illustrated portions of the vehicle include the vehicle body 12, the instrument panel 14 with appropriate instruments and controls mounted thereon as is well known in the art, the vehicle driver's seat 16, and the floorboard 18. The steering column assembly 20 has a steering wheel 22 mounted on the upper portion of assembly 20, that upper portion being illustrated as being a tilt portion 24. The steering wheel 22 may also be provided with an axial adjustment mechanism in section 23 as is found in some production vehicles. It is also understood that the steering column assembly 20 may be of the axially collapsible type furnished on most production vehicles in current production as a safety feature. The column assembly 20 extends through an opening 26 in the instrument panel 14 and passes behind and underneath the instrument panel, and through the dash, in a manner well known in the art. The steering column assembly 20 is illustrated as including axially adjustable section 23, column tilt section 24, axially collapsible section 25, a column mounted transmission shift lever 28 and an ignition lock 30. It may also include appropriate levers for turn signal and headlamp operation as well as control of the windshield wipers and windshield washers, by way of example. It may also include a suitable control for a cruise control mechanism, as is known in the art. A control lever for operating section 24 and tilting the steering wheel 22 may be provided as well as arrangements in section 23 for axial adjustment of the steering wheel if such arrangments are provided on the vehicle. Many of these controls are typically on the left side of the steering column assembly 20 and are not seen from the position in which the view in FIG. 1 is taken.

By way of example showing well known arrangements, U.S. Pat. No. 3,747,426, issued July 24, 1973 and entitled, "Adjustable Steering Column" shows a column tilt section and an axially adjustable section. U.S. Pat. No. 3,788,148, issued Jan. 29, 1974 and entitled, "Energy Absorber for Collapsible Steering Columns or the Like", shows an axially collapsible steering column section. All, or various combinations, of these sections may be found in various production vehicles. For example, many Cadillac and Buick automobiles produced over at least the last 10 years have some or all of these features.

The lower portion 32 of instrument panel 14 extends downwardly and forwardly of the vehicle, and the brake pedal arm 34 on which brake pedal 36 is mounted is suitably suspended to the dash or another body portion of the vehicle from a point underneath and behind the instrument panel lower portion 32. Similarly, the accelerator pedal lever 38 extends from the accelerator pedal 40 upwardly underneath and behind the lower portion 32 of the instrument panel 14. The brake pedal 36 and the accelerator pedal 40 are positioned in the usual manner so that the brake pedal may be depressed by foot for brake actuation and the accelerator pedal 40 may be depressed by foot for an increase in engine speed and/or power. Both pedals have a normal position wherein the brakes are released and the accelerator pedal is at the engine idle position, as is common in the art. As is better shown in FIG. 3, the accelerator pedal lever 38 has a pivot point 42 located adjacent the vehicle dash 44 which separates the vehicle engine compartment from the passenger compartment. An accelerator mounting pad, not shown, may be provided in this area. Lever 38 has an arm 46 extending generally upwardly underneath and behind the instrument panel lower portion 32. Arm 46 is moveable in the directions indicated by two-headed arrow 48 as the accelerator pedal 40 is moved in directions indicated by arrow 50 to move the linkage 52. Linkage 52 extends through the dash 44 and is operatively connected to the engine control mechanism such as an engine throttle. It is to be understood that the device may be used in engines being controlled by means other than a throttle valve, so long as the engine is controlled by a suitable linkage of the type shown. Movement of the accelerator pedal lever arm 46 in the counterclockwise direction, as seen in FIG. 3, is movement in the direction to increase engine speed and/or power, and movement in the clockwise direction is toward the engine idle position.

The mechanism embodying the invention includes the hand control body assembly or control module 54, its input member which is pilot lever 56, and two output members which are the brake rod 58 and the cable assembly 60. The control module 54 is suitably secured to the steering column housing 62 of the steering column portion 24. A mounting clamp assembly 64 is illustrated as being used for this purpose so that the assembly may be readily installed and removed as needed. The body assembly 54 includes a mounting bracket 66 which fits the outer surface of the steering column housing 62. The main body of bracket 66 is held in position against the steering column housing by means of the clamp assembly 64. Mounting bracket 66 has an upper connector flange 68 and a bracket flange 70 extending outwardly therefrom. Flange 70 supports the body assembly cover 72 as well as the body or housing 74 within the cover. Body 74 has a stepped bore 76 and a straight bore 78 formed therethrough in axially parallel but transversely spaced relation. Bore 76 has a sleeve or needle bearing 80 secured in its smaller diameter end and a ball bearing assembly 82 secured in its other, larger diameter, end with one side of the bearing assembly outer race abutting a shoulder 84 and the other side being engaged by bracket flange 70 to hold the ball bearing assembly 82 axially in position in bore 76. Ball bearing assembly 82 is of the type to take lateral thrust as well as axial thrust. A sector shaft 86 extends axially through bore 76 so that it is journaled for rotation in the sleeve bearing 80 and the inner race of the ball bearing assembly 82. Shaft 86 is provided with grooves in which snap rings 88 and 90 are fitted on either side of the inner race of ball bearing assembly 82 so that shaft 86 is prevented from moving axially within the ball bearing assembly. Therefore any axial thrust exerted along shaft 86 will be resisted by the ball bearing assembly. Likewise, any radial thrust exerted by shaft 86 will be taken up by sleeve bearing 80 and the ball bearing assembly 82. The enlarged portion of bore 76 between bearing 80 and bearing assembly 82 has a torsion spring 92 therein extending about shaft 86. Shaft 86 has a hole 94 therein in which one torsion spring end 96 extends, and the portion of body 74 radially outward of spring 92 has a slot 98 formed therein in which the other end 100 of torsion spring 92 extends. Thus one end of the torsion spring is secured in the body 74 and the other end is secured to shaft 86 so that the spring may exert a torsional force on the shaft. As will be discussed below, this force is exerted in a direction continually urging shaft 86 toward the engine idle control position.

One end of sector shaft 86 is formed with an eye 102 over which a closed end clevis 104, formed on the inner end of pilot lever 56, is positioned and secured thereto by clevis pin 106. The clevis arrangement permits the pilot lever 56 to be moved arcuately about the eye end 102 of shaft 86 in opposite directions as illustrated by arrow 108 in FIGS. 1 and 2. Pilot lever 56 may also be moved arcuately in opposite directions indicated by arrow 110 in FIGS. 1, 4 and 5. This movement will cause arcuate rotation of sector shaft 86 in bearing 80 and bearing assembly 82 about the shaft axis. The arcuate rotational movement of sector shaft 86 and pilot lever 56 in the directions indicated by arrow 110 are in a plane which is generally parallel to the plane of the steering wheel 22 and therefore generally perpendicular to the axis of the steering column assembly 20. The movement of pilot lever 56 about clevis pin 106 in the directions indicated by arrow 108 are in a plane which is perpendicular to the plane indicated by arrow 110, and therefore these movements are generally along the axis of the steering column assembly 20. Pilot lever 56 may be moved independently in the two planar directions indicated by arrows 108 and 110, or may be moved concurrently so that the movement has components represented by each of those arrows. Therefore the movement of the outer end 112 of lever 56, as seen in FIG. 1, may be through any portion of an area represented by a generally rectangular pattern. Torsion spring 92 will continually urge shaft 86 in a rotational direction such that pilot lever 56 is continually urged upwardly in a counterclockwise direction as viewed by the vehicle operator and as indicated by the upwardly pointing end of arrow 110 of FIG. 1.

The other end of sector shaft 86 is formed with a Morse taper 114 and terminates in a threaded shaft end 116. A sector 118 is provided with a tapered opening formed to be complementary to the Morse taper 114 and is fitted over the end of shaft 86 so that the sector opening and the Morse taper portion of the shaft are engaged. A retainer nut 120 is fitted on threaded shaft end 116 and is tightened so that sector 118 is secured in the desired circumferential relation on shaft 86, and is held in that position by action of the Morse taper 114 and its mating tapered surface in the opening of sector 118. The arcuate outer end 122 of sector 118 is formed with suitable gear teeth to provide a sector gear 124. An idle stop slot 126 is arcuately formed in sector 118 radially inwardly of sector gear 124. The arcs forming the side surfaces of slot 126 are arcs about the axis 128 of shaft 86. An idle stop pin 130 is fixed to body 74 and extends into slot 126 so that it permits the sector 118 to rotate arcuately relative to the pin 130 with its arcuate movements being limited by the pin.

Bore 78 has sleeve or needle bearings 132 and 134 at opposite ends thereof, and a pulley pinion 136 is rotatably received by these bearings. Pinion 136 has one end formed as a gear 138, the teeth of which are in meshed gear-driven relation with the teeth of sector gear 118. Thus arcuate movement of sector 118 will cause rotational movement of pinion 136, that pinion being driven by the gear arrangement. A snap ring 140 on pinion 136 adjacent gear 138 prevents the pinion from moving axially in one direction within bore 78. A take-up pulley 142 is secured to the other end of pulley pinion 136 outwardly of bearing 132 and effectively prevents the pinion from moving axially in the opposite direction to any detrimental extent. An idler pulley 144 is mounted on a pin 146 extending through a suitable opening in body 74 so that the axis of pin 146 is perpendicular to and between the axes of shaft 86 and pinion 136.

The push-pull cable assembly 60 includes a flexible cable 150 axially moveable within a cable sheath 152. One end 154 of cable sheath 152 is secured to the upper connector flange 68 through an opening in that connector flange. The cable sheath end 154 is preferably secured by an adjustable connector 156 so that the precise axial position of the cable sheath 152 relative to connector flange 68 may be established and maintained. Cable 150 extends outwardly beyond sheath end 154 and fits in the idler pulley groove 157 so that the cable makes a right angle turn about pulley 144. Idler pulley groove 157 is so aligned with the groove 158 of take-up pulley 142 that the cable 150 is led fairly from one pulley to the other. The end of cable 150 is provided with a ball end 160 which fits within a retaining slot formed in pulley 142 and holds the end of the cable on that pulley. This is best illustrated in FIG. 4.

As is best illustrated in FIG. 3, a bracket 162 is mounted on dash 44 under the instrument panel 14 and has a lower connector flange 164 formed thereon and positioned generally parallel to but spaced from the accelerator pedal lever arm 46. The lower end 166 of cable sheath 152 extends through an opening in the lower connector flange 164 and is connected thereto by an adjustable connector 168. Thus the ends of the cable sheath 152 are each anchored to a connector flange to precisely establish the positions of the sheath ends. Cable 150 extends outwardly beyond the cable sheath end 166 and has a cable stop ball 170 secured thereto to provide a stop for spring plate 172. Plate 172 receives cable 150 through an opening therein and is provided with openings to which tension springs 174 and 176 each have one end secured. The other ends of tension springs 174 and 176 are respectively secured to portions of bracket 162 so that the springs continually exert forces on cable 150 through plate 172 and ball 170 urging the cable 150 toward the engine idle position.

Figure 2:
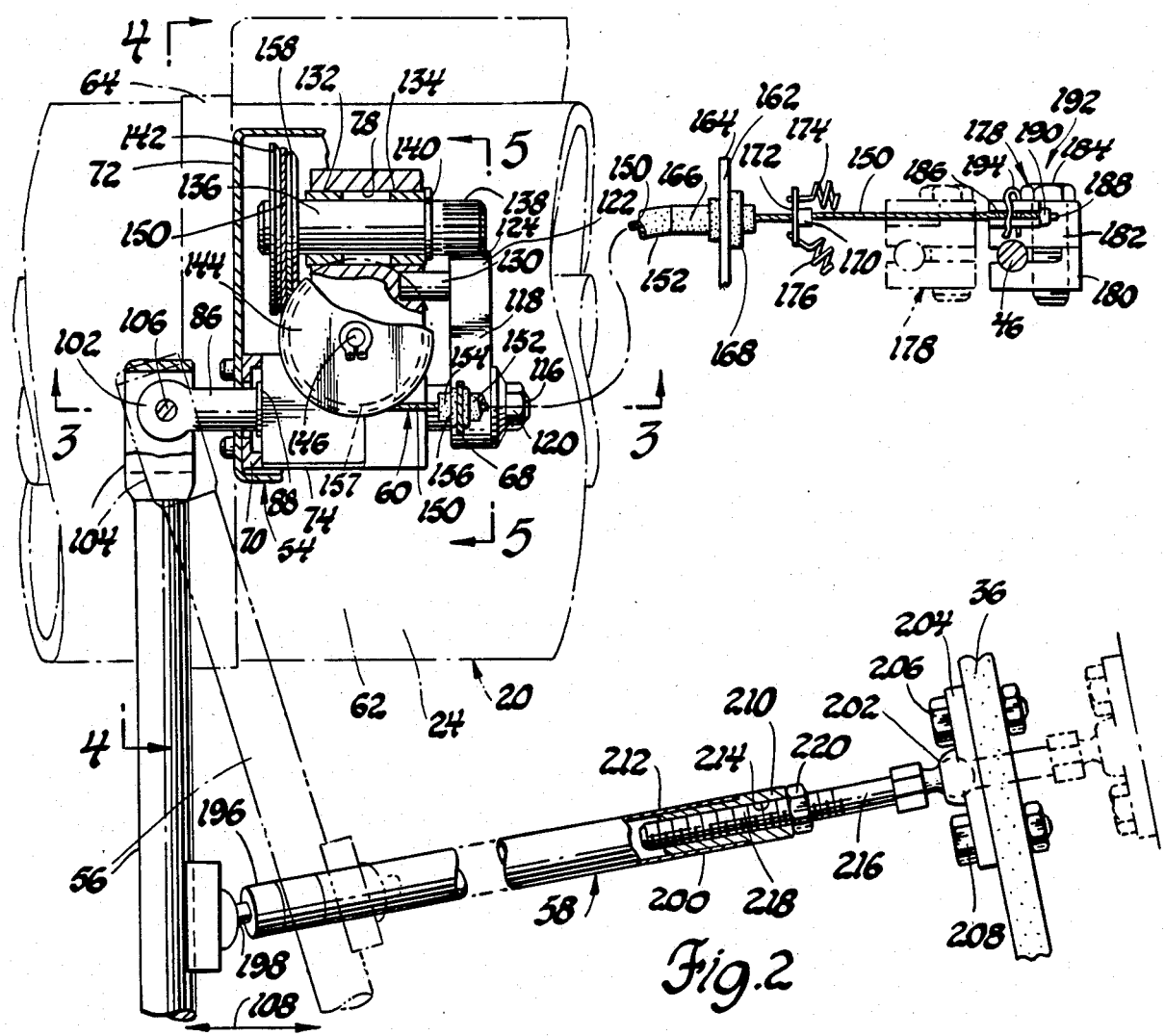
FIG. 2 is a fragmentary cross-section view of the mechanism embodying the invention as illustrated in FIG. 1 and taken in the direction of arrows 2—2 of that Figure.

A pivot and clamp assembly 178 is securely clamped to the accelerator pedal lever arm 46, as is best shown in FIG. 2. Assembly 178 includes a clamp portion 180, a pivot portion 182, and a clamping bolt 184. Lever arm 46 is received between the clamp 180 and the pivot 182 in slot portions formed therein and bolt 184 is tightened, causing the clamp 180 and the pivot 182 to tightly grip lever arm 46 and hold the assembly 178 in position on that lever arm. Pivot 182 is provided with a slot 186 through which the end 188 of cable 150 extends with a cable ball end 190 being formed on cable end 188. The cable end is therefore connected to the lever arm 46 by means of a lost motion connection arrangement 192, formed of assembly 178 and the cable end with its ball end 190. A clip 194 is inserted through suitable openings in pivot 182 on either side of slot 186 so as to retain the portion of cable 150 adjacent cable ball end 190 within slot 186 at all times.

The accelerator pedal lever arm 46 may move in the throttle opening position, that movement being in the direction of the counterclockwise arrow head of arrow 48 in FIG. 3, moving the pivot and clamp assembly 178 with it as shown in phantom view in FIG. 2. The assembly 178 will merely slide along cable 150, imparting no motion to the cable under this circumstance. This is the type of action obtained when the accelerator pedal 40 is pressed down by foot without any movement of the pilot lever 56 by hand to move cable 150. Thus direct actuation of the accelerator pedal 40 has no feedback effect on cable 150 or any portion of the assembly 54. However, when cable 150 is moved axially by rotational movement of take-up pulley 142 to pull the cable against the force of springs 174 and 176, the cable ball end 190 will act on the assembly 178 to move that assembly from the engine idle control position toward an advanced throttle position, thus moving the accelerator pedal arm 46 in the same direction and transmitting that movement to the engine control, such as a throttle. The axial movement of cable 150 is obtained by downward movement of the pilot lever 56 indicated by the lower end of arrow 110, rotating sector shaft 86 and sector 118, thereby causing sector gear 124 to drive gear 138 and pulley pinion 136 rotationally. This in turn rotates the take-up pulley 142 and further tensions cable 150 against springs 174 and 176, moving the cable axially from the engine idle control position toward the engine full throttle position. The movement may be in any desired amount to obtain the appropriate throttle opening desired by the vehicle operator. When the vehicle operator desires to have the engine throttle control return toward the idle position, he decreases the force that he exerted on pilot lever 56, or removes it completely, permitting springs 174 and 176 to move cable 150 axially to turn pulley 142 and act through gears 138 and 124, cooperating with torsion spring 92 to rotate shaft 86 and therefore lift pilot lever 56 upwardly to the zero throttle or engine idle position normally occupied by that lever when no throttle control force is being exerted thereon.

As is best illustrated in FIG. 2, the brake rod 58 is connected at its upper end 196 to the pilot lever 56, at approximately one-third to one-half of the length of the pilot lever from pin 106 to the lever end 112, by means of a suitable pivot joint 198. The lower end 200 of brake rod 58 is secured to the top of brake pedal 36 by means of another pivot joint 202 and mounting plate 204. As illustrated, mounting plate 204 is secured to the brake pedal 36 by means of two bolt and nut assemblies 206 and 208 extending through plate 204 and brake pedal 36. The portion of brake rod 58 adjacent its lower end 200 is formed with a suitable adjusting mechanism which is illustrated as including a plug 210 secured to the end of a tube forming the major portion of brake rod 58. Plug 210 is provided with internal threads 214. A rod section 216 has a threaded end 218 threaded into plug 210. After the length of brake rod 58 is properly adjusted, the lock nut 220 is tightened against the end of plug 210 to hold the brake rod 58 at its adjusted length. The other end of rod section 216 is suitably formed to provide a part of the pivot joint 202. In the drawings, pivot joints 198 and 202 are illustrated as ball and socket joints. It is to be understood that other types of pivot joints may be used. Futhermore, a suitable rod length adjustment mechanism similar to that found at the lower end of rod 58 may also be provided at the upper end 196 of the rod if additional adjustment is deemed advisable under some circumstances.

It can be seen that when pilot lever 56 is moved in the downward direction of arrow 108 of FIGS. 1 and 2 from the upper or brake released position, that direction being toward the brake pedal 36, a brake actuating force is transmitted from lever 56 through brake rod 58 to the brake pedal 36 to actuate the brakes. It has been found satisfactory to provide the mechanical leverage of the pilot lever as defined by the ends of the pilot lever and the location of the pivot joint 198 so that a maximum of about 90 pounds of force exerted on the end of the pilot lever will result in about 150 pounds of brake pedal force exerted on the brake pedal 36. With a typical production brake booster system, this is sufficient to fully operate the vehicle brakes and is within the desired design parameters for brake actuation. The brake actuating linkage, of which brake pedal arm 34 and brake pedal 36 are parts, is provided with a suitable return spring mechanism in normal production vehicles. This mechanism continuously urges brake pedal 36 upwardly into the brake release position. Therefore the brake rod 58 is also continually urged upwardly, and pilot lever 56 is continually urged in the upward direction of arrow 108 of FIG. 1, which is its brake release position.

When the vehicle operator desires to brake the vehicle, he merely pushes downwardly on the end of pilot lever 56 in the downward direction of arrow 108, causing brake rod 58 to push on the brake pedal 36 to actuate the brakes. When he releases the pilot lever 56, the brake pedal 36 moves upwardly and returns the pilot lever 56 to the brake release position. Of course, the vehicle operator may hold the pilot lever 56 in any desired brake apply position in the same manner that an able-bodied person would hold the brake pedal 36 downwardly for the same purpose. It can also be seen that an able-bodied person may readily actuate the brake pedal 36 by foot, as well as the accelerator pedal 40, without any interference from the mechanism embodying the invention.

In installing the hand control mechanism in a vehicle, two mounting holes are drilled in the brake pedal 36 to receive the bolt and nut assembly 206 and 208. The hand control body assembly 54 is attached to the steering column by means of mounting clamp assembly 64, being sure that the clamp assembly and the hand control body assembly do not interfere with operation of any of the levers on the steering column or the column tilt mechanism if the steering column is so equipped. The lower end 200 of the brake rod 58 is then attached to the brake pedal by installation of the bolt and nut assemblies 206 and 208 through plate 204 and brake pedal 36. The brake rod length is adjusted by rotating the rod tube 212 with lock nut 220 being loose so that the rod tube 212 and its plug 210 move axially on the rod section threaded end 218 until there is approximately a three-quarter inch gap between the steering wheel and the pilot lever 56. If a tilt wheel column is provided on the vehicle, this adjustment is made with the steering wheel tilted in the furtherest down position. The lock nut 220 is then tightened. If adjustment is provided and used at both ends of rod 58, both lock nuts are tightened.

To attach the end of cable 150 to the accelerator pedal arm 46, the accelerator mounting pad, not shown, is removed and one arm of the bracket 162 is inserted between the accelerator mounting pad and the dash 44. Bracket 162 is provided with suitable holes which align with the holes in the accelerator pedal mounting pad so that the mounting bolts may be retightened to hold the mounting pad as well as bracket 162 in place. The pivot and clamp assembly 178 is then installed on the accelerator pedal lever arm 46 so that the end of the cable is square to the slot in the pivot portion 182. The cable end 188 is then inserted through the slot so that the cable ball end 190 rests against the side of the pivot 182, and the cable retaining clip 194 is inserted to prevent the cable from coming out of the slot. The adjustable sheath connector 168 is adjusted so that the cable 150 is just taut. It is then backed off for a very short distance, which is usally one notch on the connector, and the connector is then secured in position by suitable means such as a retaining clip. It will be noted that before attaching the lower end of the cable to the assembly 178, the cable assembly is led through the instrument panel opening 26 alongside the steering column assembly 20 so that it does not extend out into the main portion of the passenger compartment of the vehicle. The routing of the cable assembly 60 must be checked to assure that the cable has no kinks or sharp bends and does not hang below the instrument panel so as to present any likelihood of being caught by the foot of a vehicle operator. Suitable ties or retainers may be used to support cable assembly 60 as is necessary.

If the position of the pilot lever 56 requires adjustment in either direction of arrow 110, cover 72 is removed by removing the screws holding it to the body 74 and nut 120 is loosened. A suitable pulling device is then attached to the sector 118 and it is loosened on shaft 86 where the Morse taper 114 is provided. The pilot lever 56 is then rotated to the desired position, being sure that full accelerator pedal travel can be achieved without the lever exerting pressure on the vehicle operator's leg when the pedal is moved into the full throttle or down position indicated by arrow 110. The nut 120 is then tightened in position and the cover 72 is reinstalled. The pilot lever should then be operated for both braking and engine control motions throughout the ranges thereof to assure smooth, reliable operation. A check should be made to see that normal engine idle can occur as well as transmission downshifting due to throttle advancement. Adjustments may be made to the pilot lever 56 as necessary by adjusting the position of sector 118 on shaft 86 and by adjusting the length of brake rod 58 until the engine and brake controls are properly operated by movements of the pilot lever 56.

The entire assembly may be readily removed from a vehicle by disconnecting the assembly 178 from the pedal lever arm 46, removing the plate 204 and nut and bolt assemblies 206 and 208 from the brake pedal 36, and removing the mounting clamp assembly 64 so that the entire body assembly 54 is removed from the steering column. It may then be installed in another vehicle as needed.

The embodiments of the invention in which an exclusive property or privilege is claimed are defined as follows:

1. A hand operated engine throttle and vehicle brake control mechanism for a passenger vehicle having a steering column capable of axial movement or collapse under impact and including a tiltable column section, a steering wheel on said steering column tiltable column section, an instrument panel through which said steering column extends, a brake pedal suspended below the instrument panel on a brake pedal arm for brake actuating movements generally parallel to the steering column, an accelerator pedal mounted below the instrument panel and positioned for operation by foot in the usual manner, said accelerator pedal and having a pedal and lever forming a part of the engine control linkage, the pedal lever extending under and behind the instrument panel and being pivoted so that depression of the accelerator pedal by a vehicle operator causes a portion of the pedal lever to pivotally move generally toward the steering wheel to increase engine speed and/or power, said mechanism comprising:

a hand control body assembly secured to said steering column tiltable column section immediately below said steering wheel, said body assembly having a pilot lever input member movable by a hand of the vehicle operator throughout a generally rectangular pattern defined by an engine control plane of movement generally parallel to said steering wheel and a brake control plane of movement perpendicular to said engine control plane of movement and limit positions of engine control from idle to full speed and limit positions of brake control from brake release to full brake application;

said body assembly also having a push-pull cable output member movable axially between limit positions of engine control from idle to full speed and a brake rod output member movable axially between limit positions of brake control from brake release to full brake application;

said body assembly having a rotatably movable first shaft mounted therein and connected with said pilot lever input member, said first shaft being rotationally responsive only to components of said pilot lever input member movements in the rectangular pattern which are in or parallel to said engine control plane of movement to axially move said push-pull cable;

a gear sector mounted on said first shaft for arcuate movement therewith;

a second shaft rotatably mounted in said body assembly axially parallel to said first shaft, said second shaft having a gear thereon engaging said gear sector in gear driven relation;

a first pulley rotatably mounted in body assembly with the axis of said first pulley being between and perpendicularly skew to the axis of said first and second shafts;

a second pulley secured to said second shaft to be rotatably driven thereby and having a peripheral groove with said push-pull cable laid wherein with one cable end secured to said second pulley;

said first pulley having a peripheral groove positioned in perpendicular tangential alignment with said second pulley peripheral groove with said push-pull cable also being laid therein and positioned in free leading relation from said second pulley peripheral groove;

said body assembly having cable guide means through which said push-pull cable extends from said first pulley in general axially parallel relation to the axis of said first shaft and passes outwardly of said body assembly;

said push-pull cable having another end remote from said body assembly and a lost motion connection by which said cable another end is connected to said pedal lever under and behind said instrument panel for causing said pedal lever portion to move generally toward the steering wheel to increase engine speed and/or power and permitting return movements thereof to the engine idle limit position, said lost motion connection permitting axial movements of said cable in the increasing throttle opening direction to cause corresponding throttle control linkage throttle openings movements and axial movements of said cable in the decreasing throttle opening direction permitting the throttle control linkage to move in the throttle closing direction, said lost motion connection permitting throttle control linkage throttle opening movements via the accelerator pedal independently of said input control member without moving said cable;

said body assembly having torsion spring means secured therein and acting torsionally on said first shaft and continually urging said first shaft and said gear sector and said second shaft and said second pulley and said push-pull cable toward the engine idle limit position;

said body assembly also having an adjustable length brake rod pivotally attached to said pilot lever input member at one rod end and to said brake pedal at the other rod end and responsive only to components of said pilot lever input member movements in the rectangular pattern in or parallel to said brake control plane of movement for causing said rod to move to depress said brake pedal in the brake apply direction of pedal movement and to return to the brake release limit position upon movement of said pilot lever input member to its brake release limit position;

said brake rod extending generally parallel to and closely adjacent to the steering column and having its pivotally connected ends so positioned axially and translationally relative to the tiltable steering column section as to accommodate full tilting movement of said tiltable column section without effecting axial rod movement and to also accommodate brake applications via the brake pedal independently of said input control member without effecting any axial movement of said push-pull cable;

said accelerator pedal and said brake pedal by virtue of said push-pull cable, said lost motion connection, and the position of said brake rod pivotally connected ends, being movable independently of said hand control mechanism to control the engine and the vehicle brakes, said control mechanism being unaffected by tilting and axial movements of said steering wheel insofar as its functional capability to control said accelerator pedal and said brake pedal is concerned.

* * * * *

UNITED STATES PATENT AND TRADEMARK OFFICE
CERTIFICATE OF CORRECTION

PATENT NO. : 4,627,522

DATED : December 9, 1986

INVENTOR(S) : Paul L. Ulrich, James Richards & Eugene T. Tanke

It is certified that error appears in the above-identified patent and that said Letters Patent is hereby corrected as shown below:

Column 9, line 51, before "having" delete -- and --.

Column 10, line 29, "wherein" should read -- therein --.

Column 10, line 53, "openings" should read -- opening --.

Signed and Sealed this

Twenty-eighth Day of April, 1987

Attest:

DONALD J. QUIGG

Attesting Officer

Commissioner of Patents and Trademarks